June 24, 1969 W. P. HARBOUR, JR., ET AL 3,452,151
PROTECTION FROM SIGNAL FLUTTER ON TURN OFF
Filed July 6, 1965
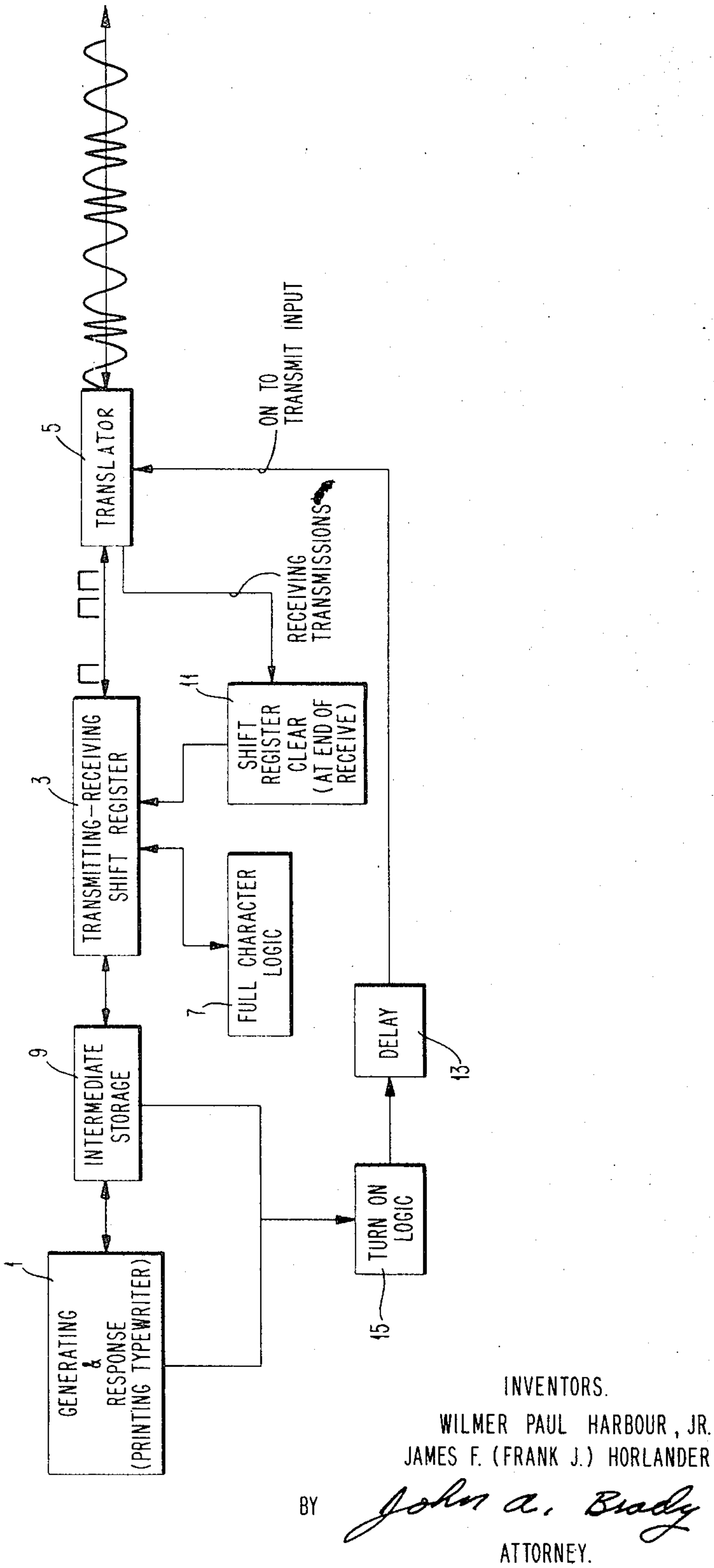
INVENTORS.
WILMER PAUL HARBOUR, JR.
JAMES F. (FRANK J.) HORLANDER
BY John A. Brady
ATTORNEY.

3,452,151
Patented June 24, 1969

3,452,151

PROTECTION FROM SIGNAL FLUTTER ON TURN OFF

Wilmer Paul Harbour, Jr., and James F. (Frank J.) Horlander, Lexington, Ky., assignors to International Business Machines Corporation, Armonk, N.Y., a corporation of New York Filed July 6, 1965, Ser. No. 469,589
Int. Cl. H04l *15/00;* H03k *21/32*
U.S. Cl. 178—3 2 Claims

ABSTRACT OF THE DISCLOSURE

A communication system is protected against noise resulting from the termination of a signal. Received data is stepped into a shift register and is not further processed in the terminal until a full character has been inserted into the register. The transmitted signal is observed and upon termination of the signal the shift register is cleared. The duration of the noise is short so that it can not appear as a full character in the register before it is destroyed by clearing the register. A delay is provided so that no signal will be transmitted by a former receiving station until all other terminals have received an indication of the termination of transmission by the former transmitting terminal.

*Disclosure of the invention*

This invention relates to the communication of data in a system with increased reliability. More specifically, this invention is concerned with the prevention of flutter noise which is often characteristic of the termination of transmission, from being recognized as data.

It is known to communicate digital pulses representative of data in modified form. A very common form is to transform binary pulses into signals of essentially identical amplitude, but of a different, preselected frequency for each the two binary pulse values. It is also common to transform the binary codes to a single frequency having two different phases for two binary conditions. Frequency or phase codes of this kind may be broadly termed as "alternating signal codes." Systems using such codes have the incidental advantage of avoiding the long distance communication of step functions and other wave forms which are difficult to transmit with good reliability. The primary advantage of frequency or phase modulation of binary data (i.e., alternating signal codes) is that a signal of constant power is continually transmitted. Repeater (a repeater is an amplifier located in the middle of long distance communications link) design can then be conceived to utilize the constant power signal to assure optimum retransmission of the signal in a long distance communications system.

It is therefore well known to insert locally generated and transmitted binary pulse signals into a virtually contiguous translator-transmitter for long distance transmission in an alternating signal code. The translator-transmitter is often known as a Data Set. At the receiving terminal a translator-receiver performs the complementary function of transforming the frequency code to pulse signal and communicating the pulses to a contiguous receiving terminal.

A significant deficiency in a frequency code system of the type described is found in the characteristics of such a system when the transmitter is switched off. In this event a fluttering signal is received at the receivers. This flutter noise tends to occur each time one terminal ceases transmitting. This can be quite troublesome. In some networks, especially those which may be broadly described as teletypewriter systems, the stations alternate as transmitters and receivers continually, and with each such alternation the signal at the previous station is switched off.

The origin of this flutter noise, which is sometimes called "glitch," is believed to be traceable to the characteristics of the tranlator-transmitter and also, perhaps primarily, to the characteristics of the translator-receiver. It is definitely established that flutter noise is received incident to the switching off of a transmitter in a communications net having no repeaters in the communications link.

The noise probably is generated by the fact that abrupt termination of an alternating signal transmitter appears as an abrupt change, or almost a step function, in the transmitted signal. As it is well known in frequency transmission art, a step function is characterized structurally by a signal containing a large number of alternating signals at varying frequencies. Thus, abrupt change in signal attendant upon termination of transmission appears to the translator-receiver as a complex, alternating frequency signal. Since the translator-receiver is designed to respond to various frequencies, it is not surprising that the complex and almost random signal received causes the translator-receiver to generate an output which flutters back and forth unpredictably between the two pulse forms which constitute the output signal of the translator-receiver.

It should be understood that it is not a purpose of this invention to eliminate the flutter noise of the type described. In this invention the existence of such noise is accepted, but means are provided to effectively isolate the receiving terminal from recognizing such noise as data.

The prior art was aware of this flutter or glitch type noise. The most pertinent prior art, however, has been based on the idea of transmitting a special code prior to termination of transmission and structuring all receivers to automatically cease recording or otherwise responding to signals received after the receipt of the special code. This prior art technique is effective, but burdens the communications system with the requirement of providing means to generate the special code and also with the requirement that the special code be generated at the transmitting terminal immediately prior to any termination of transmission.

It is a further object, therefore, in accordance with this invention to insulate a communications system from flutter noise as described without the use of a special code indicative of end of transmission.

This invention is believed to differ from the prior art in that no special signal or similar technique is used to warn that the subsequent signal may be noise. Instead any noise received is neutralized after it is received in a form no different from data.

In accordance with this invention signals received in a data communications terminal are stored in a storage register prior to the printing or other machine response to the data. Means are provided to monitor the received line for lack of transmitted signal. When termination of transmitted signal is observed, the contents of the storage register are ignored. Since it is the signals immediately preceding the termination of carrier which would be flutter noise, the system effectively eliminates any response to flutter noise.

Further in accordance with this invention, provision is made in a multiterminal network to prevent one terminal from transmitting after the termination of signal from another terminal for a predetermined time. In this manner, the effectivenes of the storage register system is assured in the multiterminal network. It would be possible otherwise for one station to begin transmitting so soon that a third station on the net would not receive a positive indication that one transmission had been terminated.

The foregoing and other objects, features and advantages of the invention will be apparent from the following more particular description of preferred embodiments of the invention, as illustrated in the accompanying drawing.

The drawing illustrates the preferred receiving terminal in accordance with this invention.

*System and problem*

This invention in its preferred form is used in a high quality teletypewriter network of the type described in United States patent application Ser. No. 451,189, now Patent No. 3,340,516, filed Apr. 27, 1965, titled Master-Slave Net Control, invented by Wilmer Paul Harbour, Jr., Robert A. Kolpek, and Thomas L. Musto, and assigned to the same assignee as this invention is assigned and also as further clarified by the publication "System Operation Reference Manual, IBM 1050 Data Communication System" File No. 1050–9, Form A24–3020–3, Major Revision, January 1965; a copyrighted publication.

In the preferred teletypewriter network, each terminal may be brought to a logical status in which that terminal is a transmitter or a receiver. Frequently in the preferred system a receiver may become a transmitter for a limited specific purpose, at which time the original transmitter again becomes a transmitter. In particular, receivers become temporary transmitters during addressing and, in another instance, to reply to error interrogations as described in the mentioned application Ser. No. 451,189. Furthermore, it is common for one transmitter to cease transmission indefinitely and for a second terminal to "seize" the communications link to transmit a message at some later time.

Regardless of the specifics of the teletypewriter system, however, the problem raised is that transmission is frequently terminated immediately subsequent to the transmission of various different predetermined codes, and also transmission is frequently terminated after a predetermined sequence of codes. Specifically, if an addressing sequence precedes a space code, then the transmitter terminates transmission and a receiver designated by the code transmitted automatically comes up as a transmitter. Perhaps more importantly, it is clear that transmission can be terminated upon system malfunction or operator error. Thus, it is not an available design alternative to structure the receiver in the manner of the prior art to recognize a space code as one which immediately precedes termination of transmission, because this is true only during an addressing sequence. Furthermore, the Error Interrogation Code (EOB) and the End of Text Code (EOT) are two other codes which also would have to be recognized should the prior art system be adopted. Should provision be made to recognize every code or code sequence immediately preceding termination of transmission, the system would still be vulnerable to unexpected contingencies.

Thus, any system to avoid flutter noise which relies upon the transmission of special code is completely vulnerable to the ever present occurrence of termination of transmission due to operator error, power failure, or system malfunction. The use of the invention herein described to avoid the effect of flutter noise at transmission termination is believed to be greatly preferable to known alternatives.

*Transmission*

Signals in this preferred system are generated at a message generating and response unit 1 (which may be a keyboard, record reader/punch or similar device) and inserted in shift register 3 as a permutation code of several binary (bit-no bit) indications. The shift register 3 holds simultaneously the number of permutation signals which make up an entire (including redundancy or similar error check bit) character. Thus, for example the shift register may hold a binary coded character representative of the letter A or of the End of Text signal.

Characters in the shift register are automatically shifted in a pulse code as suggested by the drawing to the translator 5. The translator 5, when it is operating as a transmitter, is a device which receives pulse codes and transforms those codes to frequency codes. The transformer continually generates and transmits an alternating signal when it is in an ON status as a transmitter. This frequency normally continuously generated is also the frequency transmitted to represent the binary "zero" (no bit) status in a permutation code. For the duration of a binary "one" pulse presented by shift register 3, the translator 5, when it is transmitting, generates a second, different frequency signal. Both of the two frequency signals have substantially the same amplitude. This is also suggested by the drawings.

*Reception*

Reception is accomplished by use of the same basic structures. During reception the translator 5 is powered to be operative, but it is operative in a mode which transforms frequency signals received from the communications link into pulse signals which are stepped into shift register 3. A full character received in shift register 3 is recognized by the system and used to cause logical functions at the terminal to cause message response unit 1 to print or record. A feature of such full character recognition in shift register 3 is full character logic means 7 which reads the necessary storage stages of the shift register 3 to observe a start of character bit in the last stage of the shift register and an end of character bit in the first stage of the shift register. The full character logic 7 causes read out from the shift register 3 to intermediate storage 9. From intermediate storage 9, the data is automatically read to response unit 1 under the control of an oscillator or clock. Response unit 1 prints or otherwise responds to the data.

The translator 5 is of known construction and is used without substantial modification. As the pulse code to alternating signal transformer or translator, the Western Electric Data Set 103F is preferred. The Western Electric Data Set 103F is built with an output terminal provided which generates a response condition upon the termination of received signals. That translator can be brought to both a receive mode and a transmit mode as above discussed. It should be understood that any equivalent to this alternating signal translator is equally preferred. If a translator does not have means to detect the termination of received signals, it can be modified so as to provide this capability.

The entire terminal, of course, is somewhat more detailed than need be described in order to fully teach this invention. In the actual, preferred terminal, the shift register 3 is read out in parallel (simultaneous reading of a shift register stages) to one storage device and then the data is read in parallel to a second storage device. These two extra stores allow incoming signals to overrun the local recorder somewhat without loss of data which would otherwise occur. Additionally, a read out from the first storage register is inhibited when certain error check and similar factors are not satisfied. Nonetheless, a start bit occurring in the last stage of shift register 3 is also required in the actual system, and this structural requirement establishes that an entire character will be stored in shift register 3, before data transfer means read that character from the output of the shift register 3 for ultimate use by the recorder or other response unit 1.

*The flutter inhibit*

The translator 5, when in the receive mode, generates an output when a signal of either of the two predesignated signals is on the line. In other words the translator 5 generates a signal when any other terminal is properly operating in a transmit status, and this is true even though no permutation code is currently being transmitted by the distant transmitter, since the distant transmitter is then transmitting the frequency indicative of binary "zero." The existence of either frequency transmitted can be termed a "transmission occurring" signal.

In accordance with this invention the "transmission occurring" signal is monitored by shift register clear circuit 11. The shift register clear circuit is a standard circuit element which is adapted to pulse all stages of the shift register 3 to set them to binary "zero" status.

In accordance with the structures provided by this invention, then, destruction of flutter noise is automatic. The shift register 3 acts as a buffer or time delay between the noise received and response to that noise by the rest of the terminal. A time of about 10 to 50 milliseconds is characteristic of the preferred structures as the time between the origination of flutter noise due to the loss of signal and the change of the "transmission occurring" signal to a down level. In the preferred system the bit rate (number of individual binary coded signals observed per second under the control of oscillator or clock timing) is about 150 bits per second. Thus, the shift register is not filled until about 60 milliseconds after the first start of flutter noise. At least 10 milliseconds previous to this, however, the "transmission occurring" signal goes down, and the shift register is cleared by circuit 11.

In the preferred system, no received signal is recognized by the responding portions of the terminal until a start bit (a bit of opposite sense than the "no signal" bit which is on the line between transmission of characters) reaches the stage of shift register 3 farthest operatively from translator 5. Thus, clearing the shift register 3 prevents any start bit from reaching that stage to thereby signal that a character has been received. Clearing the shift register 3 is thus sufficient in itself to return the receiving terminal to a fully cleared condition without further steps or structures being necessary. The receiving terminal, after being cleared as described, continues to monitor and respond to received signals over the communications link from the other terminals as though no flutter noise had occurred. At any time, since transmission from other stations has ceased, the receiving terminal may "seize" the line to become a transmitter in the manner described in the above cited application Ser. No. 451,189. At any time, signals may be directed to the receiving terminal, where they will be automatically recognized.

*Multiterminal timing*

It has been discovered that a communications link having multiple terminals may not respond ideally to the basic system above described. In such a system flutter noise could be recognized at one terminal, even though it was inhibited at another terminal.

Such malfunctions in a multiterminal communications link have been eliminated by a simple delay circuit 13, situated electrically between the turn on logic 15, and the turn on input of the translator 5. The delay inserted by circuit 13 prevents a receiving terminal from becoming a transmitter, even though the machine logic 15 calls for this, for the period of the delay, which is about 30 milliseconds. An example of when logic 15 would bring up the receiver is when the terminal, as described in the cited application Ser. No. 451,189, is a receiving master which must answer to an error interrogation (EOB) signal received. To insure the proper 30 millisecond delay, in all circumstances, the turn on pulse from the "bid" key, which is used by the operator to "seize" a vacant communications link, is also routed through delay circuit 13. Similarly, all other turn on signals are routed through delay circuit 13.

It is believed that the malfunctions occurring without the delay feature added are traceable to the variances in tolerances, electrical inertia, and different signal characteristics found as an inherent part of the various terminals. Thus, without the delay, one terminal could sense the end of transmission and quickly become a tarnsmitter, while another terminal, while theoretically identical and while seeing an end of transmission for at least as long as the first terminal, would not respond because the second terminal, due to slight variations in tolerances and components, would not change sufficiently in electrical status during the same time period. The signal then received from the first transmitter would then tend to reverse the previous indication to the second terminal and in many cases the second terminal would return to the status representative of transmission occurring without ever going to the status which would clear shift register 3 of flutter noise.

The provision of delay circuit 13, however, at every terminal in a communications link assures that a relatively long "no transmission occurring" status will generally appear on the line. This relatively long time is chosen to be just long enough to assure that every station will recognize the end of transmission before a transmission from a different terminal can be received.

While the invention has been particularly shown and described with reference to preferred embodiments thereof, it will be understood by those skilled in the art that the foregoing and other changes in form and details may be made therein without departing from the spirit and scope of the invention.

We claim:

1. One terminal for use in communicating with at least one other terminal over a communications link comprising:

shift register means to store a plurality of pulse coded signals received, said means having an input and output, a translator means to receive alternating signal codes from said link and to impose pulse coded signals on the input of said shift register means, means generating a signal indicative of the receipt of a complete character by said shift register means said receipt signal initiating readout of pulse coded signals stored in said shift register means from the output of said shift register means, recording means operatively connected to respond to pulse coded signals which have been delivered from the output of said shift register means, means included in said translator means to generate a control signal when no alternating signal code is effectively received by said translator means, and means responsive to said control signal to clear pulse coded signals stored in said shift register means to prevent undesired pulse coded signals from being delivered from the output of said shift register means.

2. One terminal for use in communicating with at least one other terminal over a communications link comprising:

a shift register having an input and output means and a plurality of stages to store a plurality of pulse coded signals received, a translator means to receive alternating signal codes and to communicate pulse coded signals to the input of said shift register when operative to receive, and to receive pulse coded signals and to transmit alternating signals on said communications link when operative to transmit, said translator means having an input to turn on said translator means for transmission, means generating a signal indicative of the receipt of a compelte character by said shift register said receipt signal initiating readout of pulse coded signals stored in said shift register from the output of said shift register, recording means operatively connected to respond to pulse coded signals which have been delivered from the output of said shift register, means included in said translator means to generate a control signal when no alternating signal code is effectively received by said translator means, means responsive to said control signal to clear pulse coded signals stored in said shift register to prevent undesired pulse coded signals from being delivered from the output of said shift register, and signal delay means operatively preceding said input to turn on said translator means to transmit and connected to at least one source of signals to turn on said translator means to transmit.

References Cited

UNITED STATES PATENTS

| | | | |
|---|---|---|---|
| 2,706,215 | 4/1955 | Duuren | 178—17.5 |
| 3,244,804 | 4/1966 | Wittenberg | 178—3 |
| 3,281,527 | 10/1966 | Davis | 178—3 |
| 3,336,577 | 8/1967 | Frielinghous | 178—3 |

THOMAS B. HABECKER, *Primary Examiner.*

U.S. Cl. X.R.

328—48